C. P. BROWN.
RAIL JOINT.
APPLICATION FILED SEPT. 12, 1907.
899,655.
Patented Sept. 29, 1908.
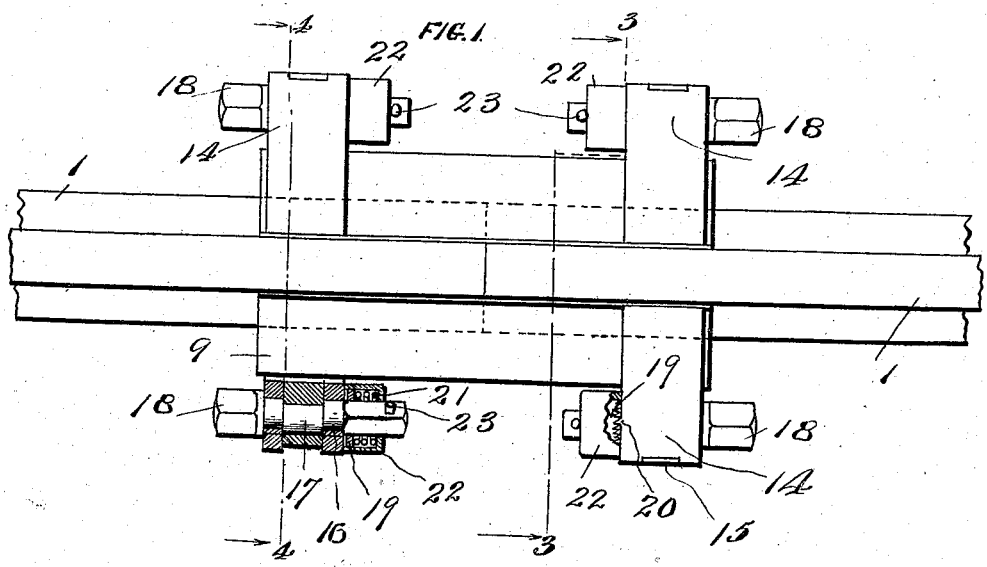
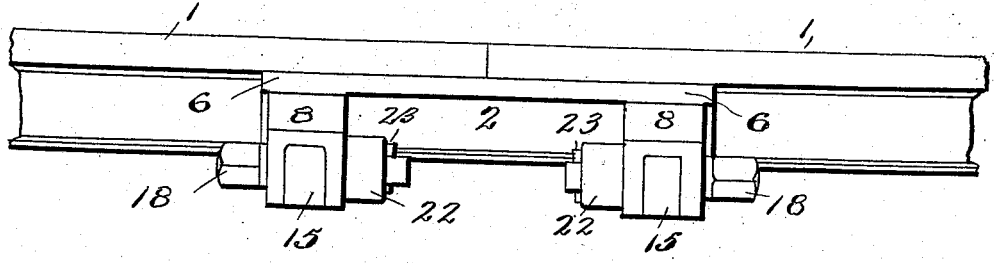
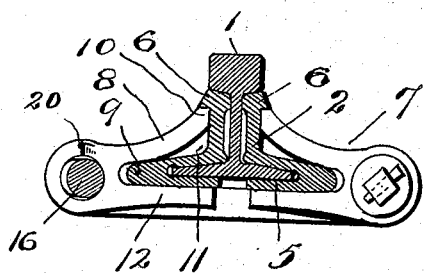 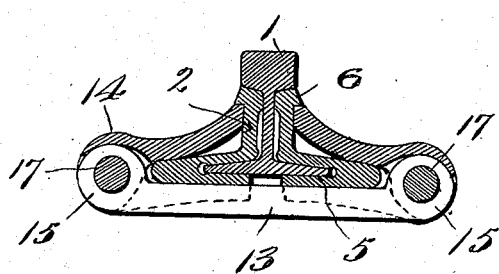
WITNESSES
Chas. K. Davies.
M. Smith.
INVENTOR
Commodore P. Brown
by Brock Beekens Smith
Attorneys

UNITED STATES PATENT OFFICE.

COMMODORE PERRY BROWN, OF RONCEVERTE, WEST VIRGINIA.

RAIL-JOINT.

No. 899,655.  Specification of Letters Patent.  Patented Sept. 29, 1908.

Application filed September 12, 1907. Serial No. 392,592.

*To all whom it may concern:*

Be it known that I, COMMODORE P. BROWN, a citizen of the United States, and resident of Ronceverte, West Virginia, have invented a new and useful Rail-Joint, of which the following is a specification.

The invention relates to rail joints.

An exemplifying structure embodying the invention will be described and the advantages of the invention fully set forth in connection with the description.

In the accompanying drawing Figure 1 is a view partly in plan and partly in section of my improved rail joint; Fig. 2 a side elevation, Fig. 3 a transverse section on the line 3, 3, Fig. 1; and Fig. 4 a transverse section on the line 4, 4, Fig. 1.

Reference numeral 1 designates two adjoining rails; 2 fish plates, one on each side of the rails bridging the joint; 5, wedge-like slots in the bases of the fish-plates engaging the rail bases; 6, the ordinary longitudinal heads of the fish plates engaging the under side of the rail heads; 7, yokes, four in number for each joint, arranged in pairs; 8, the upper arms of the yokes shaped to engage the bases of fish plates at 9 and the heads 6 at 10, preferably leaving a clearance at 11; 12, the lower arms of the yokes engaging the lower faces of the bases of the fish plates, each of the arms 12 being centrally slotted; 13, links one for each pair of clamping yokes 7, passing beneath the fish plates and between the bifurcations of arms 12 of the yokes; 14, hubs of yokes 7 at the adjoining point of their arms 8 and 12, these hubs being hollowed out at the bottom to receive enlargements 15 of links 13; 16, pins passing through holes in hubs 14 and enlargements 15 of the links 13, one pin for each yoke; 17, the center portion of the pins engaging the links 13, and placed eccentrically to the main axis of the pin; 18, squared ends of the pins 16; 19, ratchet plates mounted on the inner ends of the pins 16 and having ratchet teeth presenting toward the yokes; 20, teeth one on each yoke engaging the teeth of ratchet plates 19; 21, springs one for each ratchet plate, 22, caps fitting over the pins and forming a casing for the springs and ratchets and 23, cotter-pins passing through the pins and securing the caps 22 in position.

After the parts are loosely assembled in a manner which will be obvious to those skilled in the art from the foregoing description, the joint is tightened by applying wrenches to the nut-like ends of pin 16 and rotating the pins so as to move the eccentrics 17 away from the rails. This, by reason of the engagement of the eccentrics with links 13 forces the yokes 7 toward the rails. The arms of the yoke wedge upon the edges of the bases of the fish plates at the points 9 and the ends of arms 8 of the yokes are pressed firmly against the webs of the fish plates and against the under faces of their heads 6. This pressure is in turn communicated to the fish plates which are wedged firmly upon the bases of the rails. The heads 6 of the fish plates are also brought into firm engagement with the under faces of the rail heads.

Practically any desired clamping-pressure may be applied to the joint by the mechanism described. The ratchet-plates 19 as the pins revolve ride over teeth 20 on the yokes and serve to retain the pins in any position in which they are placed. The joint when once set up is by this means positively locked and vibration cannot loosen it. The clamping action is such as to effectively support all necessary parts and the joint as a whole is even stronger than the rail, so that no deflection at the joint is possible.

Having described my invention I claim:

1. In a rail joint the combination with the adjoining rails of fish plates having wedge shaped slots in their bases engaging the rail bases, clamping yokes arranged in pairs, a link for each pair of yokes and pins one for each yoke passing through holes in the yokes and links, each pin having an eccentric portion engaging the link.

2. In a rail joint the combination with the adjoining rails of fish plates having wedge-shaped slots in their bases engaging the rail bases, clamping yokes arranged in pairs, a link for each pair of yokes, pins one for each yoke passing through holes in the yokes and links, each pin having an eccentric portion engaging the link, ratchet plates connected to turn with the pins, a ratchet tooth on each yoke engaging the ratchet plate, springs serving to urge the plates against the teeth, and caps covering and protecting the ratchet mechanism.

3. In a rail joint the combination of the adjoining rails, fish plates one on each side of the rails, clamping yokes arranged opposite each other and engaging the fish plates, a link for each pair of yokes passing under the fish plates through slots in the lower arms of the yokes and pins passing through the yokes and links and having eccentric portions engaging the links and serving when rotated to draw the yokes toward the rails and clamp all parts.

COMMODORE PERRY BROWN.

Witnesses:
J. F. BROWN,
T. A. DEAVER.